(12) United States Patent
Nampally et al.

(10) Patent No.: US 9,003,062 B1
(45) Date of Patent: Apr. 7, 2015

(54) FRAMEWORK FOR EXCHANGING LARGE B2B TRANSACTIONAL IN-ORDER MESSAGES USING DISTRIBUTED FILE SYSTEM (DFS) AND ASSOCIATED METHOD

(71) Applicant: Software AG, Darmstadt (DE)

(72) Inventors: Aditya Babu Nampally, Hyderabad (IN); Vishal Byakod, Bangalore (IN); Sriram Mohan Telagareddy, Bangalore (IN)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 14/162,342

(22) Filed: Jan. 23, 2014

(51) Int. Cl.
*G06F 15/173* (2006.01)
*G06F 9/54* (2006.01)

(52) U.S. Cl.
CPC ...................... *G06F 9/541* (2013.01)

(58) Field of Classification Search
None
See application file for complete search history.

(56) References Cited

U.S. PATENT DOCUMENTS

| 7,240,097 | B2 | 7/2007 | Holdsworth et al. |
| 8,140,454 | B2 | 3/2012 | Bullen et al. |
| 2001/0039570 | A1* | 11/2001 | Stewart et al. ................ 709/205 |
| 2009/0063221 | A1 | 3/2009 | Jonath et al. |
| 2010/0115046 | A1 | 5/2010 | Reddy Byreddy et al. |

FOREIGN PATENT DOCUMENTS

| EP | 0 852 034 | 7/1998 |
| WO | WO 98/03910 | 1/1998 |

* cited by examiner

*Primary Examiner* — Scott B Christensen
(74) *Attorney, Agent, or Firm* — Nixon & Vanderhye, P.C.

(57) ABSTRACT

Certain example embodiments relate to a framework that helps address dynamic scalability and in-order processing of payloads, e.g., pertaining to B2B and/or other transactions. A receiver and/or sender is/are able to dynamically and/or statically provide an executable to an intermediary entity (e.g., a central payload processor or CPP) to process and/or otherwise transform payloads, en-route. This arrangement advantageously provides a very efficient way of delivering ordered content, especially when the content is extremely large. Cloud processing and/or storage facilities may be implemented in certain example instances, parallel sending and/or receiving may be provided, etc., in addressing issues relating to how to send large amounts of data over large distances to possibly multiple recipients.

29 Claims, 5 Drawing Sheets

FRAMEWORK FOR EXCHANGING LARGE B2B TRANSACTIONAL IN-ORDER MESSAGES USING DISTRIBUTED FILE SYSTEM (DFS) AND ASSOCIATED METHOD

TECHNICAL FIELD

Certain example embodiments described herein relate to application integration techniques using brokers. More particularly, certain example embodiments described herein relate to a framework including a central payload processor (CPP) that processes and/or otherwise transforms potentially large payloads, en-route, while still maintaining ordering. Senders and/or receivers are able to statically and/or dynamically provide to the CPP processing logic for processing and/or otherwise transforming the payloads in certain example embodiments.

BACKGROUND AND SUMMARY OF EXAMPLE EMBODIMENTS OF THE INVENTION

Companies today are tasked with implementing solutions for many types of integration challenges within their respective enterprises. Many of these challenges involve issues of application integration (e.g., integration among and/or between software applications and/or other systems) and fall into common patterns. For instance, globalization-related trends have prompted business houses stationed across the geographies to participate in active trading worldwide. But these new opportunities come with the challenge of integration. Whether business-to-business (B2B) transactions across borders will be successful can depend on numerous factors such as, for example, the ease of adoption of new technologies, lighter on-premises installations, scalability (e.g., to address spikes in transaction volumes), improved or optimized bandwidth utilization, maintaining the proper ordering of transactions, etc. Many B2B transactions currently are facilitated by exchanging business payloads over Internet.

For example, a first challenge area relates to propagation of similar business objects from one system to multiple other systems, such as, for example, in an order status change or a product price change. A second area relates to synchronization of similar business objects between two or more systems to obtain a single view, such as, for example, a real-time synchronization of customer, product registration, product order, and product SKU information among several applications. This is one of the most common issues requiring an integration solution. In a one-way synchronization, there generally is one system (e.g., resource) that acts as a data source and one or more resources that are targets of the synchronization. In a two-way synchronization, every resource often is both a potential source and target of a synchronization. There generally is not a single resource that acts as the primary data resource. Thus, a change to any resource should be reflected in all other resources. A third area involves information joined from multiple sources into a common destination system, such as, for example, communicating pharmacy customer records and prescription transactions and website data into a central application and database.

Various tools have been provided that enable a user to design and deploy solutions that address these challenges using, for example, the publish-and-subscribe model or one of its variants. The publish-and-subscribe model is a specific type of message-based solution in which messages are exchanged anonymously through a message broker. Applications that produce information that needs to be shared make this information available in specific types of recognizable documents that they publish to the message broker. Applications that require information subscribe to the document types they need.

At runtime, the message broker receives documents from publishers and then distributes the documents to subscribers. The subscribing application processes or performs work using the document and may or may not send a response to the publishing application.

In a typical system, an integration server or applications running on an integration server publish documents to a broker. The broker then routes the documents to subscribers located on other integration servers. The integration server and the broker share a fast, efficient process for exchanging documents across the entire system.

Brokers can be linked to form units known as territories, and brokers that form a territory may sometimes function as a single logical broker. Clients that connect to one broker in a territory can automatically exchange documents with clients connected to any of the brokers in the territory. Territories can be organized in any desired way, e.g., to take into account factors such as, for example, geographical distribution of clients and/or back-end services, the types of services offered, actual and/or expected traffic, actual and/or expected processing loads, etc. Territories thus may help support scalability by allowing one to segment traffic among multiple brokers, while still treating the brokers as a single operational unit.

Alternatively, or in addition, brokers can be grouped into clusters. As used herein and is understood by those skilled in the art, territories and clusters are different concepts. Clusters may be thought of as including a set of loosely or tightly connected computers (depending on the implementation) that work together so that they can in many respects be viewed as a single system. Territories as described herein typically will have no master/slave relationship, whereas the same is not necessarily true when clusters are involved. In this vein, one further difference as between territories and clusters may relate to the way in which clusters oftentimes are set up and run (e.g., apart from the master/slave concept) and, more particularly, to the notion of typically using clusters to distribute workload and solve performance and/or reliability issues with a system, as these concepts generally are not associated with what a territory does. For instance, a territory may use a set of brokers to distribute the workload, and also frequently may involve a message, document, or the like, being published to all subscribers across all brokers at the same time, e.g., such that a publisher client only has to publish to a nearest (or any) broker, with the system ensuring that subscriber clients in the group (allowed to receive the publication) can access it from its nearest (or any) broker in the territory (or even through a territory gateway to another territory). By contrast, a cluster might in some cases help to distribute the workload amongst the brokers in a cluster, but involve a message, document, or the like, being published to only one broker in a cluster.

Consortiums of companies in and across industries have come forward in attempts to standardize the payload format for which these and/or other transactions are made. Yet traditional solutions of processing B2B transactions directly between senders and receivers or via a B2B exchange continue to face challenges related to the sending/receiving of large business payloads, as these are bandwidth and other resource intensive operations. In addition, the ability to dynamically scale up on-demand while still maintain the order of processing the payloads with neither the sending party nor the receiving party becoming a bottleneck of the transaction can be a challenge.

That is, because current technology current solutions process B2B transactions directly between the sender and receiver, or via a B2B exchange, optimizations in processing large payloads and in turn maintaining the order in which these payloads are processed typically is performed via the sender/receiver of the B2B transaction. Thus, at least one of the entities needs to have processing capabilities, and the overall data footprint over the network can be high. In addition, both sender and receiver side clients need to be up to ensure that the payload is properly sent and received. This can be particularly challenging when so-called small and medium enterprises (SMEs) do not have a continuous Internet presence.

Thus, it will be appreciated that there is a need in the art for improved integration techniques, e.g., in situations where large amounts of data are to be processed, the ordering of the processing is to be maintained, etc.

One aspect of certain example embodiments relates to a framework that helps address dynamic scalability and in-order processing of payloads, e.g., pertaining to B2B and/or other transactions.

Another aspect of certain example embodiments relates to enabling a receiver and/or sender to dynamically and/or statically provide an executable to an intermediary entity (referred to as a central payload processor (CPP) in certain example embodiments) to process a payload, en-route. This arrangement advantageously provides a very efficient way of delivering ordered content, especially when the content is extremely large.

Still another aspect of certain example embodiments relates to leveraging cloud computing techniques to make available high computing power and geographical distribution of storage space (e.g., even to SMEs).

Still another aspect of certain example embodiments relates to enabling the receiver to be down when the sender sends the payload, while still maintaining the order of the payload, and potentially enabling the payload to be processed and the results delivered later.

Yet another aspect of certain example embodiments relates to implementing map-reduce functionality at the intermediary entity that has high processing capabilities.

Certain example embodiments make use a CPP as a pre-agreed upon unit provided between senders and receivers, where the sender of a B2B payload does not send the payload directly to the receiver. It instead sends the payload to the CPP, and the CPP includes processing resources sufficient to use preconfigured executable programs and/or fetch executable programs dynamically from the receiver, e.g., to process the payload. The CPP thus is able to handle large payloads and maintain the order of the processing. This approach is advantageous in that the receiver need not have high processing capabilities, the sending entity can have payloads intended to be sent to multiple receiving entities being processed with a much smaller network data footprint, receivers need not be up when the sender sends the payload, etc.

In certain example embodiments, there is provided a method of processing at a CPP payloads sent from a sending entity (e.g., on behalf of one or more receiving entities). The method comprises: receiving, from the sending entity (e.g., and at the CPP), a payload to be processed for the one or more receiving entities; and determining, for each of the one or more receiving entities, whether an appropriate bundle of executable logic is currently available at the CPP for processing the received payload for the respective receiving entity. For each said receiving entity: in response to a determination that there is an appropriate bundle of executable logic currently available at the CPP for processing the received payload for the respective receiving entity, the received payload is processed using at least one processor of the CPP in connection with that currently available bundle of executable logic; and in response to a determination that there are no appropriate bundles of executable logic currently available at the CPP for processing the received payload for the respective receiving entity, an attempt is made to retrieve a new bundle of executable logic from the one or more receiving entities. Following successful processing of the received payload, results of the successful processing are transmitted to the one or more receiving entities and/or stored in a non-transitory computer readable storage medium of the CPP.

According to certain example embodiments, the payload to be processed may be received from the sending entity in pre-formed fragments generated at the sending entity.

According to certain example embodiments, the method may further include receiving, from the sending entity (e.g., and at the CPP), a group of payloads to be processed together for the one or more receiving entities. Moreover, an indication of an order in which the payloads in the group are to be processed may be received, and the payloads in the group may be processed in that order. This may be accomplished in certain example embodiments by synchronizing a payload registry of the CPP with a payload registry of the sending entity in order to ensure that the order is maintained.

According to certain example embodiments, the method further may further involve waiting to transmit to the one or more receiving entities successful processing results, e.g., until all payloads in the group are successfully processed.

According to certain example embodiments, when an attempt to retrieve a new bundle of executable logic from the one or more receiving entities fails, the payload may be maintained at the CPP until a subsequent attempt to retrieve a new bundle of executable logic from the one or more receiving entities is successful; and when an attempt to retrieve a new bundle of executable logic from the one or more receiving entities is successful, the received payload may be processed using at least one processor of the CPP in connection with that newly retrieved bundle of executable logic.

In certain example embodiments, a central payload processor is provided, and it comprises: at least one processor and a memory; a file system backed by non-transitory computer readable storage media; a cache of executable programs; and a communication channel configured to receive, from a sending entity, a group of payloads to be processed for at least one receiving entity. In response to a group of payloads being received over the communication channel, the at least one processor, for each said payload in the group, is configured to: determine, for each said receiving entity, whether an executable program is currently available in the cache for processing the respective payload for the respective receiving entity; for each said receiving entity: (a) in response to a determination that there is an executable program currently available in the cache for processing the respective payload for the respective receiving entity, process the respective payload using the at least one processor of the CPP in connection with that currently available executable program, and (b) in response to a determination that there are no executable programs currently available in the cache for processing the respective payload for the respective receiving entity, retrieve a new executable program from the respective receiving entity and process the respective payload using the at least one processor of the CPP in connection with the newly retrieved executable program; and following successful processing of the respective payload, transmit results of the successful processing to respective receiving entity.

In certain example embodiments, a computer system is provided and it includes at least one sending entity and at least one receiving entity. The computer system also comprises a payload processor including: at least one processor and a memory, a file system backed by non-transitory computer readable storage media, a cache of executable programs, and a communication channel configured to receive, from the at least one sending entity, a group of payloads to be processed for at least one receiving entity. In response to a group of payloads being received over the communication channel, the at least one processor of the payload processor, for each said payload in the group, is configured to: determine, for each said receiving entity, whether an executable program is currently available in the cache for processing the respective payload for the respective receiving entity; for each said receiving entity: (a) in response to a determination that there is an executable program currently available in the cache for processing the respective payload for the respective receiving entity, process the respective payload using the at least one processor of the payload processor in connection with that currently available executable program, and (b) in response to a determination that there are no executable programs currently available in the cache for processing the respective payload for the respective receiving entity, retrieve a new executable program from the respective receiving entity and process the respective payload using the at least one processor of the payload processor in connection with the newly retrieved executable program; and following successful processing of the respective payload, transmit results of the successful processing to respective receiving entity.

In certain example embodiments, there is provided a non-transitory computer readable storage medium tangibly storing instructions that, when executed by at least one processor of a system, perform the above-described and/or other methods.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
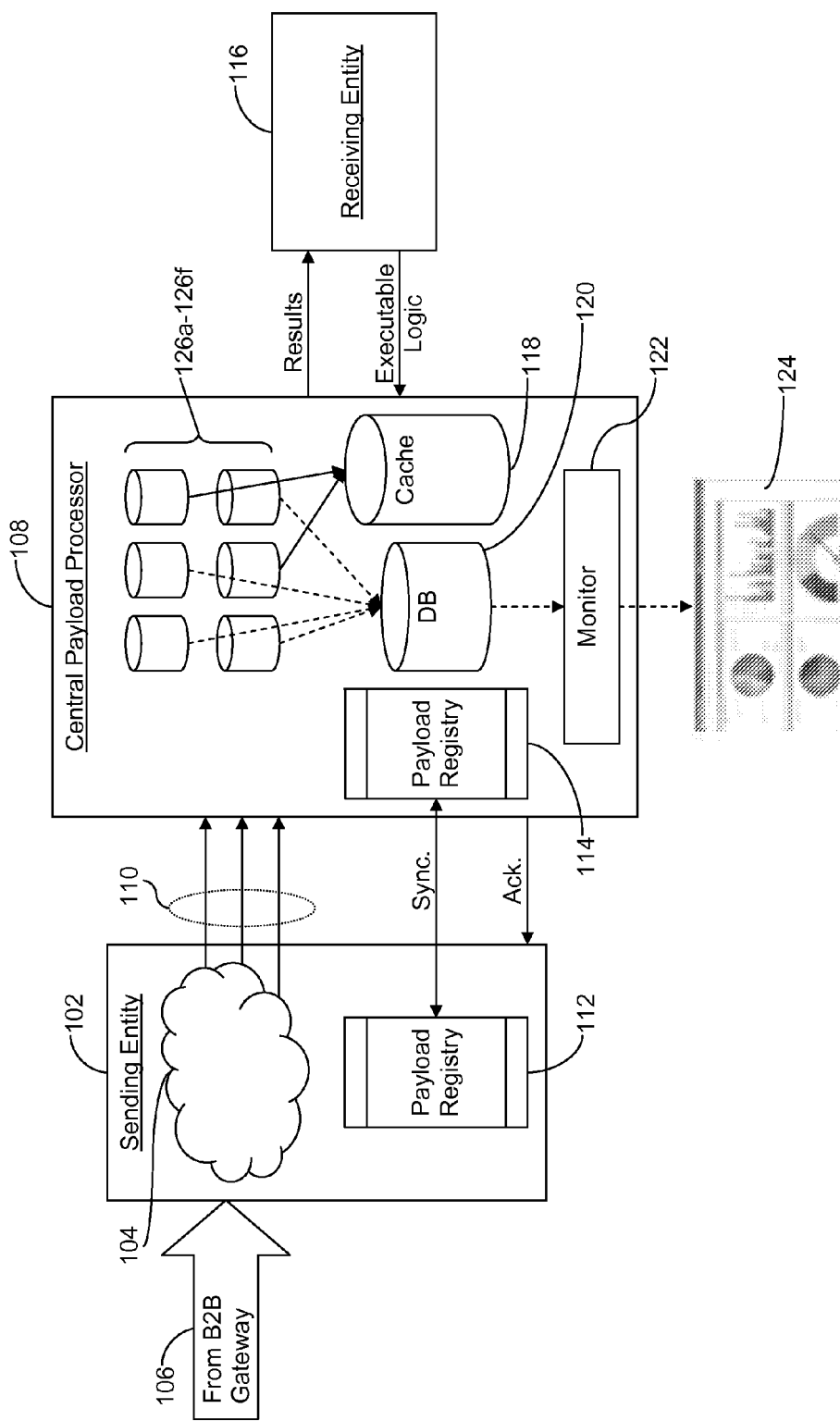
FIG. 1 is a block diagram demonstrating the flow and processing of a payload in connection with a framework in accordance with certain example embodiments.

Certain example embodiments send a payload to a mutually agreed upon central payload processor (CPP), which may be located in the cloud. In certain example embodiments, the CPP may implement a distributed file system (DFS). Multiple CPPs may be provided in a processing environment, and a particular CPP to be used may be selected on criteria including, for example, proximity to the geographical location of the sender; bandwidth between the sender and CPP; total distance between the sender, CPP, and receiver(s); bandwidth between the sender, CPP, and receiver(s); etc. The use of such criteria may help in reducing the length of time the payload is in transit before it reaches its destination (which, in certain example embodiments, will be the CPP) and thus help in reducing bandwidth usage and the time needed before processing is complete. The CPP of certain example embodiments may maintain a registry in a non-transitory computer readable storage medium, indicating the order in which payloads are to be processed. Thus, unlike certain conventional techniques for processing B2B transactions where the sender sends the business payload (e.g., a purchase order adhering to an established industry standard) all the way to the receiver over the Internet, certain example embodiments instead send payloads for processing by the CPP, which then relays the results of the processing to the appropriate party or parties, regardless of whether the end consumer is one or more originally-intended receiver, the original sender, and/or some other party or parties.

Receivers may have installed thereon executable programs corresponding to the payload types. The CPP may maintain a cache including the payload types supported by a receiver and/or the corresponding executable programs installed on the system, and such information may be specified at design time. The CPP may process the payloads as per the order registered in the registry, using a map-reduce algorithm. That is, in certain example embodiments, the CPP determines the payload type and the receiving entity. Based on corresponding entries in the cache, the CPP allocates the appropriate executable program(s) to work on the payload, and sends an acknowledgement to the sending entity and processed results to the receiving entity. If the payload is intended to be sent to multiple receiving entities, the CPP may allocate resources to, potentially in parallel, pick the corresponding executable program(s) installed on a per receiving entity basis (e.g., again based on the payload type) and process the payload accordingly. In this way, the CPP can use multiple executable programs for the same payload type, e.g., to cater to multiple receiving entities.

If a receiving entity has not installed an executable program for a given payload type, the CPP may send a request to the receiving entity to provide it with an executable program capable of processing the new payload type. It will be appreciated that this fulfilling such a request may depend on the receiving entity being online to receive the message and respond to the request with the needed executable program(s). In the event of a receiving entity being offline, however, an exception may be sent to the sending entity alerting it to the current inability to process the payload. The payload may be retained on the CPP until the receiving entity is back online to provide the executable to process the payload in certain example embodiments.

In certain example implementations, the framework may allow the sending entity to pre-load and/or dynamically load payload processors. This may be beneficial in cases where, for example, payload processing is defined by the sending entity, is recognized across the industry with an agreed upon or de facto modus operandi, etc. Thus, the receiving entities may be able to consume the processed payload without having to worry about providing the processor and application logic needed to arrive at the results.

The CPP may in certain example embodiments be equipped with the capability to monitor the occurrence of events in the system, e.g., on a real time or substantially real time basis. The executable programs may for instance be coded to implement standardized interfaces of the CPP, e.g., to aid in logging operational statuses, processing successes/failures, times to completion, resource utilization, etc., to a monitor database or the like. The CPP may expose application programming interfaces (APIs) for fetching Key Performance Indicators (KPIs) related to the payloads that are being received and processed as part of the B2B transaction, e.g., based on the payload type, a built-in call, etc. This may help enable receiving entities in developing thin-client apps for mobile and/or other electronic devices, etc., to fetch these KPIs at predetermined intervals, upon request from a user or an application, etc. Of course, it will be appreciated that other applications may be run on these and/or other devices (such as tablets, smart phones, laptop computers, desktop computers, servers, etc.).

The CPP of certain example embodiments thus may help ensure in-order processing of large business payloads with improved bandwidth and infrastructure usage, while also potentially adding business value by providing interested parties with KPI- and/or other management-related metrics to possibly aid in making decisions.

Example Implementation

This section provides details concerning example components of a framework that may be used in connection with certain example embodiments. It will be appreciated that the various components may be provided in different multiplicities, communicative arrangements, architectures, and/or the like, and may communicate using any suitable protocol(s).

Referring now more particularly to the drawings in which like reference numerals indicate like parts throughout the several views, FIG. 1 is a block diagram demonstrating the flow and processing of a payload in connection with a framework in accordance with certain example embodiments. The sending entity 102 in FIG. 1 is a gateway server 104 receiving potentially large business payloads, e.g., created from various internal business departments, as represented by the arrow 106. These large payloads may be a part of a B2B transaction and may have to be processed in a particular order (e.g., the same order as they are received on the gateway server 104). A sequence number may identify the payload's rank, e.g., in a group of payloads. The sending entity 102 is responsible for forwarding on the payloads it receives (e.g., in the order in which they are received). One approach that may be used is to block the gateway server 104 from receiving the next payload until the current payload in context is dispatched, although it will be appreciated that this approach may lead to bottlenecks at the gateway server 104. Parallel sending by scaling-up on demand may be used. However, it will be appreciated that it may be difficult to implement full parallelism on both the sending and receiving sides, as the order may be lost in parallel sends as the payloads are relayed to the sending entity 102 at different times, e.g., based on the size of the payload that is sent to it. Another way certain example embodiments may handle transmissions involves parallel receiving and sequential sending processes, although it will be appreciated that his approach may involve slowness related to sequential sending and payloads being piled up.

Certain example embodiments may route the payloads received on the gateway server 104 when and as they are received from internal departments 106. The sending entity 102 may scale-up on demand to perform parallel receives (e.g., from internal departments 106) and allocate a resource to each of these payloads to be sent to the central payload processor (CPP) 108. Thus, the sending entity 102 will not wait for all or a subset of the payloads that form the transaction, but instead will route them to the CPP 108 over parallel write channels 110 as soon as they arrive at the gateway server 104. To preserve the order of processing, the sending entity 102 may include a local payload registry 112 that synchronizes with a payload registry 114 in the CPP 108, the latter of which maintains the order in which payloads are to be processed by the CPP 108. In certain circumstances deemed beneficial, the framework may allow the sending entity 102 to pre-load and/or dynamically load payload processors to the CPP 108.

The CPP 108 may be tasked with performing a number of different operations in certain example embodiments. The CPP 108 itself may be implemented as any suitable combination of hardware, software, firmware, and/or the like, on a computer system. The CPP 108 may be cloud based, for instance, in that processing resources may be distributed to multiple different computer systems provided in different geographic regions or the like. It will be appreciated, however, that the CPP 108 will include or otherwise have access to at least one processor, a memory, and storage, e.g., for implementing the operations described herein.

The CPP 108 may split incoming payloads across the nodes in the distributed file system (DFS) cluster or the like. An example DFS that may be used is the Hadoop Distributed File System (HDFS), although it will be appreciated that other file systems (including other distributed or non-distributed file systems) may be used together with or in place of an HDFS.

As alluded to above, the CPP 108 may maintain a registry 114 that holds a list of payload entries that are uniquely identified by a payload identifier or the like. The registry 114 may be dynamically updatable and synchronizable with the registry 112 of the sending entity 102, for instance. Each payload entry in the registry 114 may include details such as, for example, information identifying the sending entity 102, information identifying the receiving entity 116, payload type, payload ID, sequence number, etc. This information may be extracted by the CPP 108, e.g., from the payload itself, header information included with the payload, separate information passed on by the sending entity 102, etc. It will be appreciated that the some or all of the same or similar information may be stored in the payload registry 112 at the sending entity 102, e.g., for synchronization purposes. It also will be appreciated that the registries 112 and 114 may aid in maintaining the order in which the payloads are to be processed.

The CPP 108 maintains a cache 118 of all the executable programs already installed by a receiving entity 116. Hence, when a payload is received by the CPP 108 intended to be processed for receiving entity 116, it chooses the appropriate (already-installed) executable, e.g., based on the payload type or the like. If the payload is intended to be sent to multiple receiving entities, the CPP 108 may allocate resources to access the corresponding executable program(s) 116 installed on a per receiving entity basis and process the payload accordingly, with the accessing and/or processing optionally being performed in parallel for the different receiving entities. In the event a new payload type is encountered, the CPP 108 may send a request to the receiving entity 116, in order to obtain an executable program capable of processing the new payload type. It will be appreciated, however, that this may depend on the receiving entity 116 being online, e.g., to respond back to the request with the needed executable program. In the event of Receiving Entity being offline, an exception may be sent back to the sending entity 102, e.g., informing it of the inability to process the payload at that time. However, the payload may be retained on CPP 108 (e.g., in its DFS) until the receiving entity 116 is back online and able to provide the executable to process the payload.

On finding the right executable, the CPP 108 may act as the cluster on which the executable programs can run, using map-reduce algorithms and/or the like, e.g., in order to process the segments of the payload stored across different nodes in the cluster and collating the processed results. The processing may include data transformations, validations, business acknowledgements, and/or the like, e.g., as specific to a particular payload type. The executable program may update the status of the processing in the database 120, which can be accessed via the monitor 122 (and/or APIs thereof) to generate Key Performance Indicators (KPIs) viewable by an authorized party (e.g., a manager) via a user interface 124 running on a terminal or the like operably connected to the CPP 108. A plurality of executables 126a-126f are shown in FIG. 1, although it will be appreciated that more or fewer executables may be provided in different implementations. In FIG. 1, the dashed lines The CPP 108, after processing the payloads pertaining to a transaction, may send an acknowledgement to the sending entity 102 and the processed results to the receiving entity 116, as appropriate.

Certain example embodiments may involve multiple CPPs. However, the CPP 108 that is used in certain example embodiments may the CPP instance that is in closest proximity to the sending entity 102, so as to reduce the likelihood of latency delaying the payload from reaching a stage where it can be processed. Similarly, a CPP may be selected based on it being closer to the sending entity 102 than the receiving entity 116. For instance, if two businesses participants are geographically spaced apart by 10,000 miles, rather than sending across a gigabyte-sized payload the entire way, the payload may be sent to a CPP located within a 100 mile radius of the sending entity. The CPP 108 in certain example embodiments may be an on-premises cluster of nodes, hosted in an on-demand private and/or public cloud (e.g., based on the data security requirements), etc. It will be appreciated that a public cloud host may aid in reducing the cost of ownership of resources needed for a B2B or other transaction. It will be appreciated, however, that other architectures may be used in different example embodiments.

The receiving entity 116 in a conventional system would have been the entity receiving the entire large payload, storing it locally, and processing it. It will be appreciated from the description above, however, that this more conventional approach may have shortcomings such as, for example, the potentially extensive infrastructure requirements associated with the storing and processing, burdens placed on the network, sequential processing potentially leading to bottlenecks, latency costs related to the data being transmitted across geographies, etc. By contrast, certain example embodiments help make it possible for the receiver entity 116 to be a simple lightweight server that delegates the job of storing and processing of the payload to the CPP 108 and simply works on the results of the processing. It also will be appreciated that, compared with situations where a conventional receiving entity is doing the processing, the receiving entity 116 of certain example embodiments does not have to be online as long, as the CPP 108 has (or at least is able to obtain) the requisite executable programs to process the incoming payloads.

Figure 2:
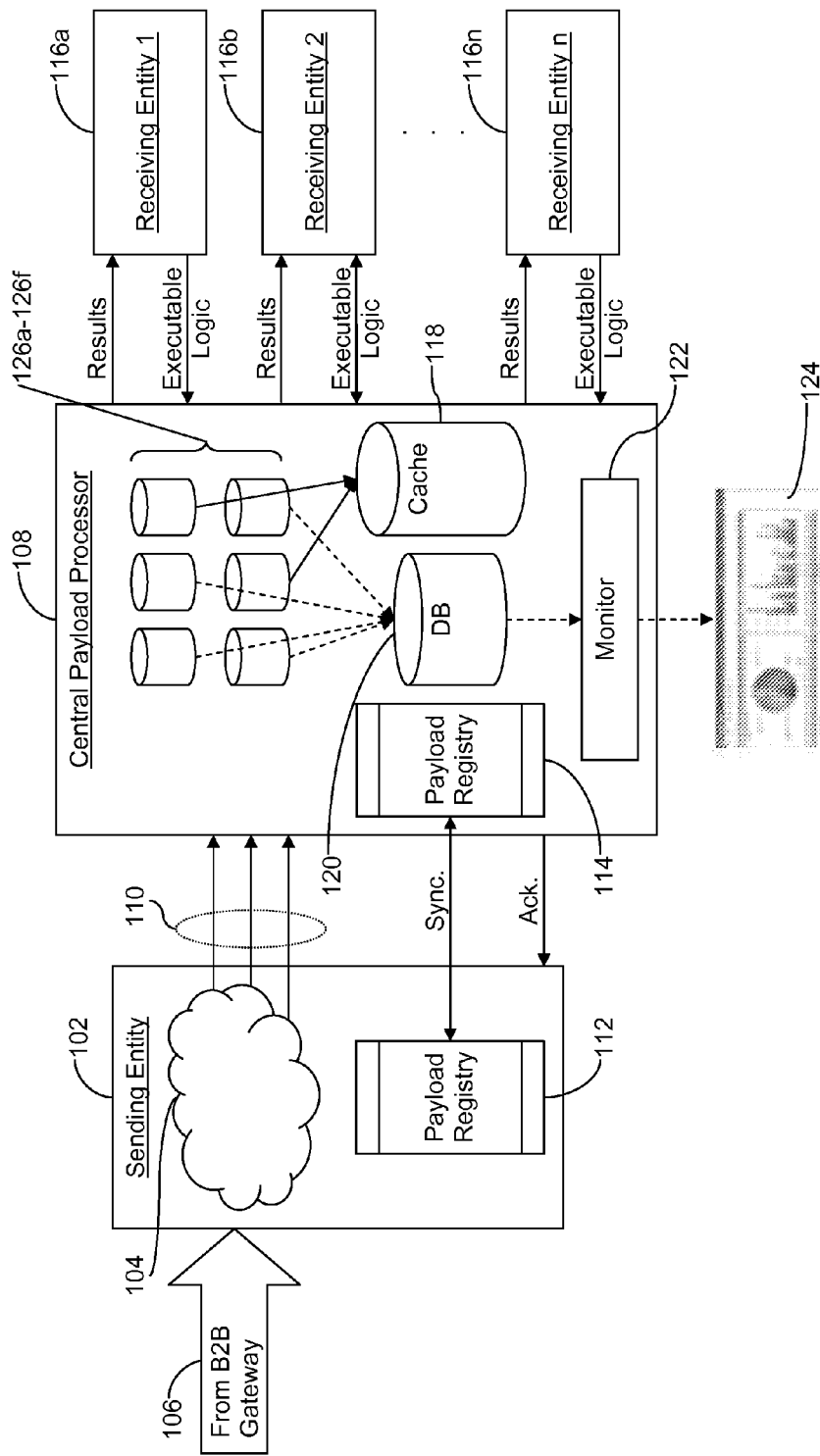
FIG. 2 is a block diagram showing a central payload processor (CPP) sending the payload to multiple recipients in accordance with certain example embodiments.

As alluded to above, multiple receiver entities may be provided in certain example embodiments. An example arrangement is shown in FIG. 2. That is, FIG. 2 is a block diagram showing the CPP 108 being operable to send the payload to multiple recipients 116a-116n in accordance with certain example embodiments. As explained above, the CPP 108 may in certain example instances have executables for each of the recipients 116a-116n to which the results of the processed payload are to be distributed. It also will be appreciated that executables may be reused for different ones of the recipients 116a-116n, where compatible. Thus, it will be appreciated that one-to-one, one-to-many, and/or many-to-many executable-to-recipient mapping may be provided in different cases, e.g., depending on compatibility factors such as, for example, desired results format, prioritizations, etc.

A payload may be data represented in any format such as, for example, an open or proprietary industry standard (e.g., according to RosettaNet, Enterprise Business XML (ebXML), Electronic Data Interchange (EDI), etc.), and/or the like. It thus may be a message, document, encrypted byte stream, etc. Exchanges of these payloads may be grouped together in a sequence to form a business transaction or the like. In general, the larger the payload, the more time and cost savings may be possible in processing the same using the techniques of certain example embodiments.

The CPP 108 delegates the actual processing of the payload to one or more executable programs 126a-126f that can plug into the flow of execution and hand the results back to the CPP 108, e.g., for temporary and/or persistent storage (e.g., in a data store), transmission to the receiving entity 116, feedback to the sending entity 102, KPI and/or other analysis (e.g., as mediated by the monitor 122), etc. The executable programs 126a-126f may be custom-defined for a receiving entity 116 to operate on a specific payload type. This may be facilitated by, for example, defining standard contracts (e.g., interfaces) in the CPP 108. Developers of these programs may at least attempt to ensure that implementing the executable honors these contracts and makes the appropriate CPP API calls. In order to enable the executable program to plug into the CPP framework, it may be implemented as extending the standard contracts defined in the CPP framework. The knowledge of this can either be proprietary to the organization implementing CPP, publicized in a developer's guide, and/or the like. The organization implementing CPP also may in some instances create some standard libraries of executable programs if it chose to, e.g., similar to an API or the like. It will be appreciated that the executable programs are in some respects and in some instances the business logic intended to be executed on behalf of receiving entity on the CPP. Hence, the input and output of the executable program may be dependent on the B2B messaging standard to which it adheres. Examples Java source code examples are provided below, although it will be appreciated that the source code may be provided in any appropriate language.

The CPP 108 is equipped with the ability to monitor the occurrence of real time events or substantially real time events occurring in the system. The executable programs may be coded to implement standardized interfaces of the CPP 108, e.g., to log the operational status, processing progress, processing resource utilization, sender/recipient information, executable usage, etc., to a database accessible by the monitor 122. The CPP 108 may, for example, expose APIs for fetching the KPIs related to the payloads that are being received and processed as part of the transaction. This may help enable the receiving entities to develop apps or other programs to fetch these KPIs as indicated above.

Payloads may traverse a number of states including some or all of the following and/or other example states:

PAYLOAD_INTRANSIT: This state pertains to a payload that is still in transit and is yet to be received completely by the CPP.

PAYLOAD_TO_PROCESS: This state pertains to a payload that is being received by the DFS and waiting for its turn to be picked up for processing.

PAYLOAD_PROCESSING: This state pertains to a payload that is currently undergoing processing.

PAYLOAD_WAITING_FOR_EXECUTABLE: This state pertains to the interim time in which the CPP has sent a request to the receiving entity to furnish an appropriate executable program.

PAYLOAD_PROCESSING_COMPLETE: This state identifies a payload that has been successfully processed by the executable program.

PAYLOAD_PROCESSING_ERROR: This state pertains to a situation where an error occurred during payload processing.

The monitor 122 may maintain information about when these states are encountered, e.g., to provide end-to-end lifecycle views of payload processing and/or management of payload processing, resource utilization, etc. For example, such information may be fed into a map-reduce algorithm to ensure that the DFS and/or other resources is/are being used in advantageous and potentially optimized manners.

As indicated above, the database 120 may serve as the executable programs' log such that operating conditions, etc., are maintained and made accessible for KPI monitoring, report generation, etc. Reports may be generated based on complex event processing (CEP) queries and/or the like. See, for example, U.S. Pat. No. 8,140,454, the entire contents of which are hereby incorporated herein by reference, regarding how KPIs can be analyzed for root cause analyses. See also U.S. Publication No. 2009/0063221, the entire contents of which are hereby incorporated herein by reference, regarding other relevant KPI-related techniques.

Figure 3:
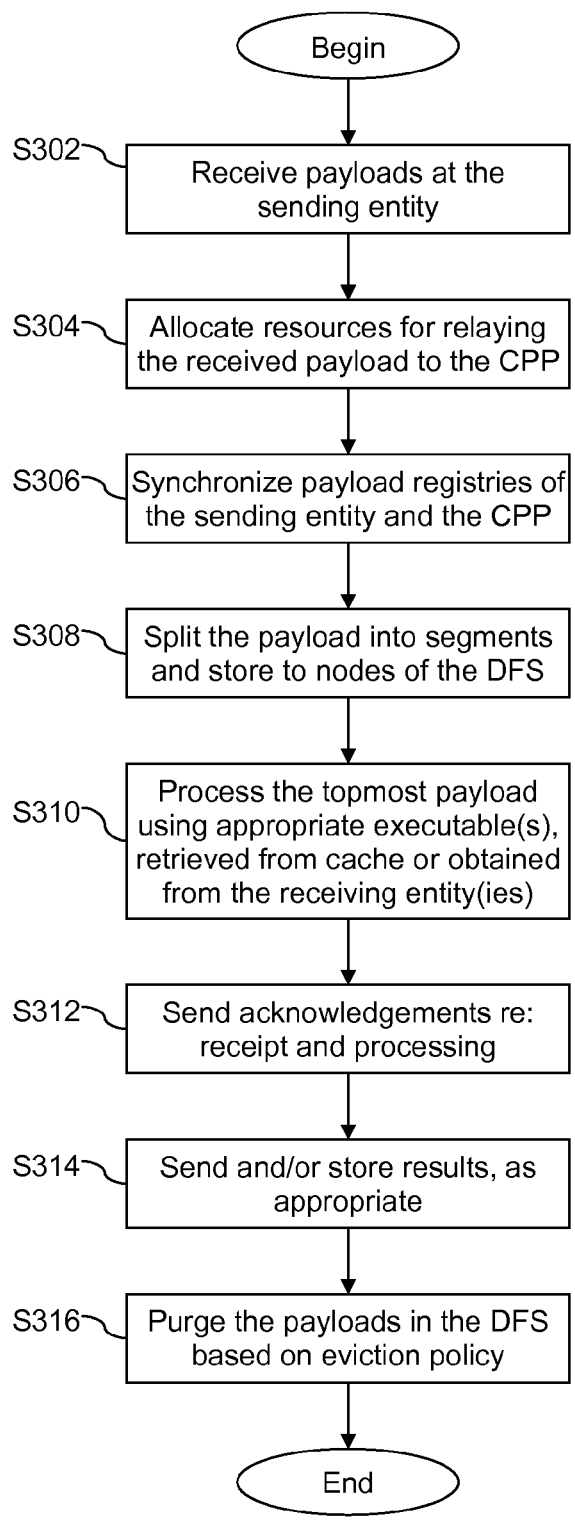
FIG. 3 is a flowchart showing an example process for handling payloads using a CPP, in accordance with certain example embodiments.

FIG. 3 is a flowchart showing an example process for handling payloads using a CPP, in accordance with certain example embodiments. In step S302, the gateway server at the sending entity receives payloads from one or more payload producers, which may in some cases be internal departments at an organization. These payloads may be grouped together and belong to a common transaction and adhere to a set order. As indicated in step S304, when the gateway server receives a payload, it allocates a resource (e.g., a thread in the same system, a new node in the cluster for load-balancing purposes, and/or the like) to help take care of sending the payload to the CPP. The gateway server in certain example embodiments will not be blocked in the meanwhile, as it delegates the payload dispatching to a new resource. A background thread in the sending entity helps continuously synchronize the payload registry of the sending entity and the payload registry of the CPP, as indicated in step S306.

Figure 4:
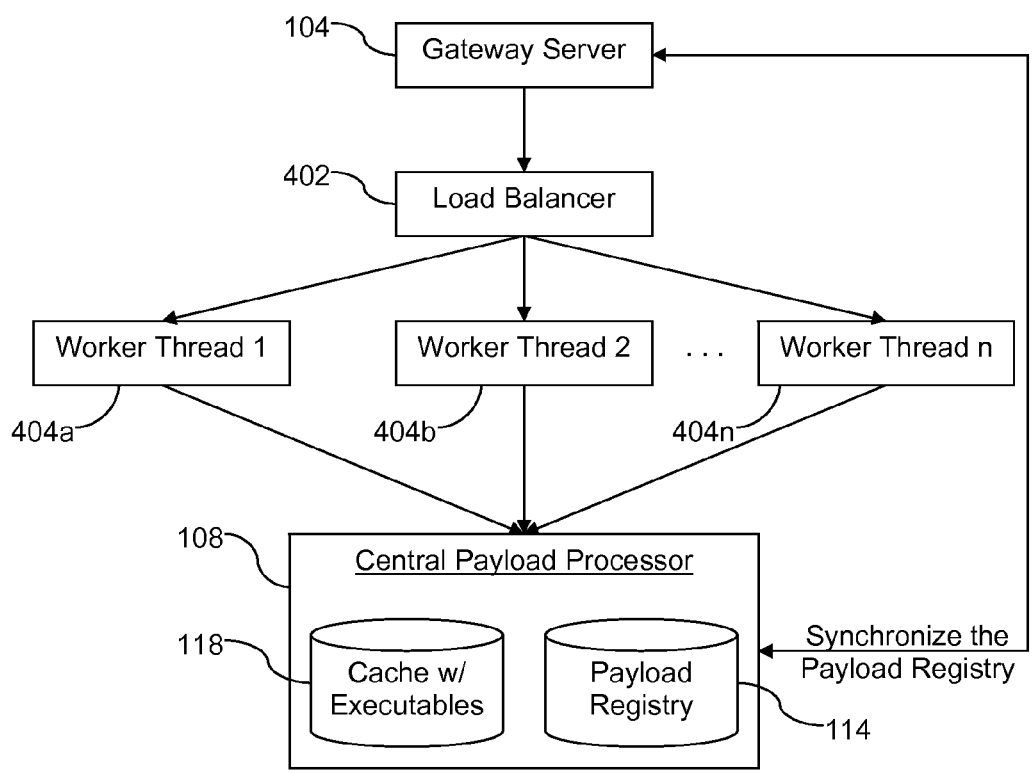
FIG. 4 is a simplified view of a payload flow, from the sending entity to the CPP in accordance with certain example embodiments.

An alternate view of these operations is presented in connection with FIG. 4, which is a simplified view of a payload flow, from the sending entity to the CPP in accordance with certain example embodiments. As shown in FIG. 4, the gateway server 104 uses a load balancer 402 and multiple worker threads 404a-404n in order to aid in sending the payload to the CPP 108, and the payload registries are synchronized.

Referring once again to FIG. 3, as shown in connection with step S308, the payload may be split into segments and stored across different nodes in the file system of the CPP (which may be implemented as a DFS such as the HDFS or the like).

In step S310, a process that is continuously running in the background of the CPP picks up the topmost payload in the payload registry (which may be implemented as a queue or priority queue, in certain example embodiments) and searches the cache for the corresponding executable program. If the executable program has already been installed in the CPP (e.g., by the receiving entity), the payload segments spread over the DFS may be processed, e.g., using a map-reduce algorithm and collating the results. If the payload is intended to be sent to multiple receiving entities (e.g., as described in connection with FIG. 2), the CPP allocates resources to, optionally in parallel, pick the corresponding executable program(s) a per receiving entity basis (e.g., based on the payload type) and processes the payload accordingly. On the other hand, as alluded to in step S310, if a payload type does not match with any of the existing/installed payload types for a receiving entity, an attempt may be made to obtain an appropriate executable dynamically.

Figure 5:
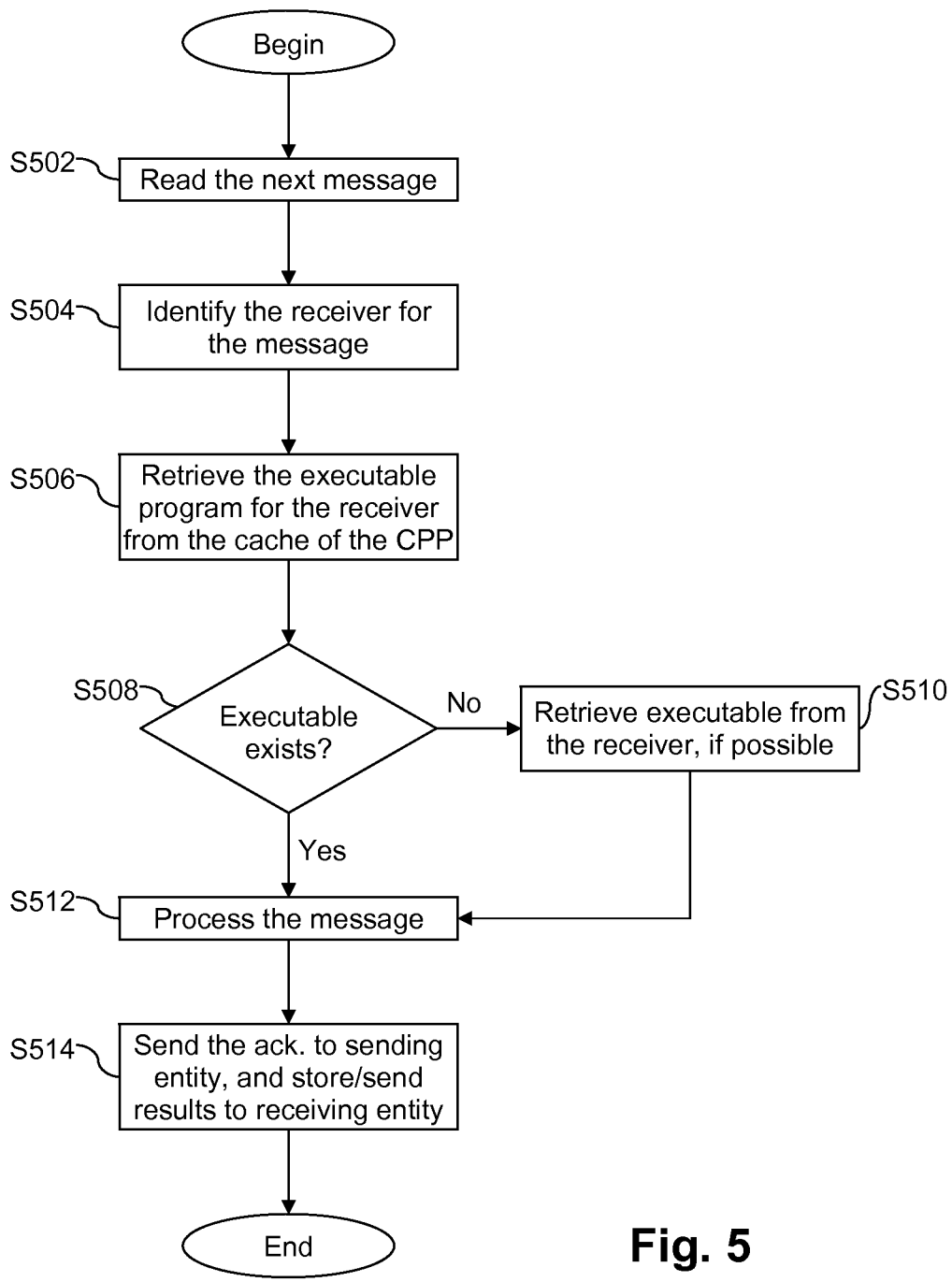
FIG. 5 is a simplified view of the CPP processing the payloads as per a dynamic order indicated by the payload registry, in accordance with certain example embodiments.

An example process for doing so is described in connection with FIG. 5. That is, FIG. 5 is a simplified view of the CPP processing the payloads as per a dynamic order indicated by the payload registry, in accordance with certain example embodiments. As shown in FIG. 5, the message (payload portion) is read in step S502, and a receiver for the message is identified in step S504 (e.g., based on metadata associated with the message or the like). An attempt is made to retrieve the executable for the receiver from the cache of the CPP in step S506, and a determination of whether this is successful is made in step S508.

If there is a failure, then the CPP sends a request to the receiving entity to provide an executable program capable of processing the new payload type in step S510. The receiving entity may need to be online to respond to the request, e.g., with the needed executable. In the event of the receiving entity being offline, an exception may be sent back to the sending entity, informing it of the inability to process the payload at that time. However, the payload may be retained on the DFS until the receiving entity is back online to provide the executable to process the payload.

Once the executable is received from step S510, or in the event that the determination in step S508 indicates that there is a copy of a valid executable in the cache of the CPP, the message (payload) is processed in step S512. In step S514, an acknowledgement is sent back to the sending entity, and results are stored at the CPP and/or forwarded on to the receiving entity, as appropriate. These latter two steps also are shown in FIG. 3, as steps S312 and S314.

In step S312, the executable program checks for the sequence number of the payload and, after processing of the last payload in transaction, it may send an acknowledgement message to the sending entity indicating the successful reception and processing of the payloads sent to it. In step S314, the CPP, based on its configuration may send the results to the receiving entity, store the results to be pulled by the receiving entity at a later time (e.g., when the receiving entity comes back online, when it needs the data, etc.). This configuration data may be provided as metadata sent with the payload.

In step S314, based on an eviction policy agreed upon by the sending and receiving entities, for example, the payloads in the DFS are purged. Relevant policies may involve maintaining payloads until they are processed, until all payloads in a defined group of transactions are processed, until all payloads received within a certain amount of time are processed, until they are no longer needed, for a predetermined amount of time, etc. Entities optionally can choose to store the payloads in local or remotely hosted databases for future references in certain example embodiments.

Example Java code snippets relating to the example aspects above-described is provided below. It will be appreciated that such functionality may be implemented in languages other than Java in different example embodiments. The example code snippets below also assume, at least in part, that RosettaNet payload related data is used. However, it will be appreciated that other payload contents, formats, types, etc., may be used in different example embodiments.

```
public interface IRequestPayload;
public interface IResponsePayload;
public class RosettanetRequest implements IRequestPayload{
}
public class RosettanetResponse implements IResponsePayload{
}
public interface IExecutableProgram {
    public IResponsePayload execute (PayloadEntry entry);
}
public class RosettaNetExecutableProgram implements
IExecutableProgram {
    public RosettaNetResponse execute (RosettanetRequest reqPayload) {
        //All the processing for a rosettanet payload goes here.
    }
}
public interface IPersistenceManager {
    public void persist ( );
}
public class HadoopPersistenceManager implements IPersistenceManager {
    public void persist ( ) {
        //Hadoop related persistence goes here.
    }
}
public class CentralPayloadProcessor {
    public void startup ( ) {
        //At startup, kick off the Payload Processor to start
        //processing the payloads from the file system.
        processNextPayload ( );
    }
    public void payloadGateWay ( ) {
        //This is the method exposed to the senders to send the payload
        //All payloads to CPP land here first
        //Steps include:
        //1. Read the header and identify the payload type
        //2. Call IPersistenceManager.persist ( ) to kick off persistence of
        // the payload
    }
    public void processNext Payload ( ) {
        while (true) {
            PayloadEntry entry = Registry.getTopMostPayloadEntry ( );
            if (entry.isPersisted ( ) ) {
                IExecutableProgram exec = cache.getExec (entry.getReceiver ( ),
                                    entry.getMsgType ( ) );
                if (exec != null) {
                    exec.execute (entry);
                }
            }
        }
    }
}
class Gateway extends Thread {
    int corePoolSize = 4;
    int maximumPoolSize = 8;
    int keepAliveTime = 5000;
    ExecutorService executorService = new ThreadPoolExecutor
    (corePoolSize,
        maximumPoolSize, keepAliveTime, TimeUnit.MILLISECONDS,
        new LinkedBlockingQueue<Runnable> ( ) );
    public void run ( ) {
        //receive the payload from the gateway endpoint
        process Payload (payload);
    }
    public void process Payload ( ) {
        executorService.execute (new Runnable ( ) {
            public void run ( ) {
                //Send the payload to the CPP
                sendPayloadTo CPP (payload);
            }
        });
    }
}
```

In certain example embodiments, the sender may be able to provide processing logic together with or apart from the receiving entity or entities.

Although certain example embodiments have been described as relating to B2B transaction related payloads, it will be appreciated that the example techniques set forth herein have applicability to other contexts and data types. For instance, the example techniques set forth herein may be used in business-to-consumer (B2C) transaction related payloads, as well as non-transactional payloads in general (e.g., regardless of the particular context). It is understood that the term "payload" is to be interpreted broadly, e.g., as including data to be processed and/or otherwise manipulated by some party for some intermediate or end purpose.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of processing at a central payload processor (CPP) payloads sent from a sending entity, the method comprising:
    receiving, by the CPP from the sending entity over a network, a payload for processing for one or more receiving entities, wherein the one or more receiving entities does not include the sending entity;
    determining, by the CPP for each of the one or more receiving entities, that an appropriate bundle of executable logic is currently unavailable at the CPP for processing the received payload for the respective receiving entity in a cache of the CPP;
    for each said receiving entity, processing based on the determining, by the CPP, the payload, the processing comprising:
        in response to a determination that there are no appropriate bundles of executable logic currently available at the CPP for processing the received payload for the respective receiving entity, attempting to retrieve a new bundle of executable logic from the one or more receiving entities and in response to retrieval of the new bundle of executable logic, perform the processing of the received payload using at least one processor of the CPP in connection with the retrieved new bundle of executable logic,
    wherein, the CPP is configured to attempt to perform the processing of the received payload using at least one processor of the CPP in connection with a currently available bundle of executable logic when the appropriate bundle of executable logic is currently available at the CPP; and following processing of the received payload, transmitting results of the processing to the one or more receiving entities over the network or storing the results in a non-transitory computer readable storage medium of the CPP for retrieval by the one or more receiving entities over the network.

2. The method of claim 1, wherein the payload to be processed is received from the sending entity in pre-formed fragments generated at the sending entity.

3. The method of claim 1, further comprising storing the payload in a distributed file system of the CPP.

4. The method of claim 3, further comprising purging the payload from the DFS based on a predefined eviction policy.

5. The method of claim 1, further comprising receiving, from the sending entity, a group of payloads to be processed together for the one or more receiving entities.

6. The method of claim 5, further comprising:
receiving an indication of an order in which the payloads in the group are to be processed; and
processing the payloads in the group in that order.

7. The method of claim 6, further comprising synchronizing a payload registry of the CPP with a payload registry of the sending entity in order to ensure that the order is maintained.

8. The method of claim 5, further comprising waiting to transmit to the one or more receiving entities successful processing results until all payloads in the group are successfully processed.

9. The method of claim 1, further comprising sending an acknowledgement message to the sending entity when receipt of the payload and successful processing of the payload are complete.

10. The method of claim 1, further comprising:
when an attempt to retrieve a new bundle of executable logic from the one or more receiving entities fails, maintaining the payload at the CPP until a subsequent attempt to retrieve a new bundle of executable logic from the one or more receiving entities is successful; and
when an attempt to retrieve a new bundle of executable logic from the one or more receiving entities is successful, processing the received payload using at least one processor of the CPP in connection with that newly retrieved bundle of executable logic.

11. The method of claim 1, further comprising monitoring the processing of the payload.

12. The method of claim 11, generating key performance indicator related reports based on the monitoring.

13. The method of claim 1, further comprising:
storing the results in a non-transitory computer readable storage medium of the CPP when the one or more receiving entities is unavailable; and
transmitting the stored results in response to the one or more receiving entities becoming available.

14. The method of claim 1, wherein the payload is to be processed for a plurality of receiving entities.

15. A non-transitory computer readable storage medium tangibly storing instructions that, when executed by at least one processor of a computer system, perform the method according to claim 1.

16. A central payload processor (CPP), comprising:
at least one processor and a memory;
a file system backed by non-transitory computer readable storage media;
a cache of executable programs; and
a communication channel configured to receive at the CPP, from a sending entity over a network, a group of payloads for processing for at least one receiving entity, wherein the at least one receiving entity does not include the sending entity;

wherein, in response to a group of payloads being received over the communication channel, the at least one processor, for each said payload in the group, is configured to:
determine, for each said receiving entity, whether an executable program is currently available in the cache for processing the respective payload for the respective receiving entity,
for each said receiving entity: (a) in response to a determination that there is an executable program currently available in the cache for processing the respective payload for the respective receiving entity, attempt to process the respective payload using the at least one processor of the CPP in connection with that currently available executable program, and (b) in response to a determination that there are no executable programs currently available in the cache for processing the respective payload for the respective receiving entity, retrieve a new executable program from the respective receiving entity and process the respective payload using the at least one processor of the CPP in connection with the new retrieved executable program, and
following processing of the respective payload, transmit results of the processing to the at least one respective receiving entity over a network.

17. The CPP of claim 16, wherein the file system is a distributed file system configured to decompose received payloads into fragments storable to nodes thereof.

18. The CPP of claim 16, wherein a plurality of payloads are provided in a received group of payloads being received over the communication channel.

19. The CPP of claim 18, further comprising a payload registry synchronizable with a corresponding payload registry of the sending entity to ensure that the payloads in the group are processed in an order specified by the sending entity.

20. The CPP of claim 18, wherein the at least one processor is further configured to wait to transmit to the at least one receiving entity successful processing results until all payloads in the group are successfully processed.

21. The CPP of claim 18, wherein the at least one processor is further configured to send acknowledgement messages to the sending entity when receipt of each said payload in the group is complete and/or when processing thereof is complete.

22. The CPP of claim 16, wherein the at least one processor is further configured to store the results in a non-transitory computer readable storage medium of the CPP, at least while the at least one receiving entity for which the results are intended is unavailable.

23. The CPP of claim 16, wherein the communication channel comprises a load-balanced set of channels over which pre-formed fragments of payloads are sendable.

24. The CPP of claim 16, wherein the at least one processor is further configured to maintain, for a failed retrieval of an executable program, the corresponding payload at the CPP at least until a subsequent attempt to retrieve a new executable program is successful.

25. A computer system, comprising:
at least one sending entity;
at least one receiving entity; and
a payload processor including:

at least one processor and a memory, a file system backed by non-transitory computer readable storage media, a cache of executable programs, and a communication channel configured to receive, from the at least one sending entity over a network, a group of payloads for processing for at least one receiving entity, wherein the at least one receiving entity does not include the at least one sending entity;

wherein, in response to a group of payloads being received over the communication channel, the at least one processor of the payload processor, for each said payload in the group, is configured to:

determine, for each said receiving entity, whether an executable program is currently available in the cache for processing the respective payload for the respective receiving entity, for each said receiving entity: (a) in response to a determination that there is an executable program currently available in the cache for processing the respective payload for the respective receiving entity, process the respective payload using the at least one processor of the payload processor in connection with that currently available executable program, and (b) in response to a determination that there are no executable programs currently available in the cache for processing the respective payload for the respective receiving entity, retrieve a new executable program from the respective receiving entity and process the respective payload using the at least one processor of the payload processor in connection with the newly retrieved executable program, and following processing of the respective payload, transmit results of the processing to a respective receiving entity over a network.

26. The system of claim 25, wherein payloads transmittable through the payload processor include B2B transaction payloads.

27. The system of claim 25, wherein a plurality of payloads are provided in a received group of payloads being received over the communication channel, and wherein the payload processor further comprises a payload registry synchronizable with a corresponding payload registry of the at least one sending entity to ensure that the payloads in the group are processed in an order specified by the at least one sending entity.

28. The system of claim 25, further comprising a load balancer interposed between a source of the payloads and the payload processor, wherein the at least one sending entity is configured to transmit to the payload processor fragmented payloads.

29. The system of claim 25, wherein the at least one sending entity is configured to determine whether to process payloads through the payload processor based on a geographical relationship between the at least one sending entity and the payload processor.

\* \* \* \* \*